Patented Feb. 16, 1943

2,311,599

UNITED STATES PATENT OFFICE 2,311,599

MANUFACTURE OF CULTURED BUTTERMILK

Charles Schwartz, Pittsburgh, Pa., assignor to Hall Laboratories, Inc., Pittsburgh, Pa., a corporation of Pennsylvania No Drawing. Application September 8, 1939, Serial No. 293,976

5 Claims. (Cl. 99—59)

This invention relates to the manufacture of cultured buttermilk and more particularly to a process of making cultured buttermilk, the flavor of which is improved and in which wheying off during the process of manufacture is minimized. The process involves the addition to skim milk containing bacteria culture of a small amount of molecularly dehydrated phosphate as will be more particularly pointed out.

Cultured buttermilk is ordinarily made by adding to pasteurized skim milk a certain quantity of a culture of lactic acid or other bacteria called "the starter," maintaining the material at a given temperature, say about 70° F., for approximately three hours or until the desired acidity, flavor and aroma have been acquired, and then the material is cooled and bottled. Granules of butter are occasionally added directly to the cultured milk or a certain quantity of whole milk is mixed with the skim and the resultant material is churned to form butter so that it may more closely approach the appearance and flavor of the genuine buttermilk.

In the manufacture of cultured buttermilk, difficulties are sometimes encountered in maintaining a uniform flavor and in preventing or minimizing wheying off. I have found that by adding a small amount of a molecularly dehydrated phosphate to the skim milk at the same time as or shortly after the starter is added, it is possible to prepare a buttermilk of improved body with a true starter flavor and to prevent entirely or to minimize the amount of wheying off which takes place. By minimizing or preventing the wheying off which would normally occur in the production of buttermilk according to prior practice in which no molecularly dehydrated phosphate is added, I increase the milk sugar content of the cultured buttermilk because, as is well known, the whey is a straw colored liquid containing milk sugar. The addition of molecularly dehydrated phosphate at the same time as or shortly after the bacteria culture is added cuts down the wheying off and accordingly increases the milk sugar content of buttermilk made according to my invention. I prefer to use about ½ ounce of phosphate to ten gallons of skim milk but this amount may be varied within relatively wide limits, say from ⅛ ounce or ¼ ounce to one ounce or 1½ ounces of phosphate per ten gallons of skim milk, depending upon the type of buttermilk to be made, the exact method of procedure in making it and the final flavor desired.

The molecularly dehydrated phosphate which I prefer to use is the molecularly dehydrated sodium phosphate which is a polymer of sodium metaphosphate ($NaPO_3$). This preferred molecularly dehydrated phosphate is glassy and is substantially neutral in character. The preferred phosphate is commonly known as "Graham's metaphosphate" or "Graham's salt" and is believed to be the hexametaphosphate $(NaPO_3)_6$. Sodium metaphosphate has a molar ratio of $Na_2O$ to $P_2O_5$ of 1:1 and is substantially neutral in character. It contains about 31% $Na_2O$ and 69% of $P_2O_5$. Although I prefer to use "Graham's metaphosphate," I may use those molecularly dehydrated phosphates which are alkaline in character or those which are very slightly acid. The alkalinity or acidity of the molecularly dehydrated phosphates may be controlled by varying the ratio of $Na_2O$ to $P_2O_5$ in the starting material. Thus by reacting different proportions of sodium carbonate and phosphoric acid and heating the mixture to a temperature sufficient to drive off water of constitution, molecularly dehydrated phosphates giving different pH values in solution may be obtained. Whereever necessary, by increasing the alkalinity of the phosphate used, it is possible in a small measure to control the acidity of the final product. This is desirable at times.

Instead of the substantially neutral glassy sodium metaphosphate having the molar ratio of $Na_2O$ to $P_2O_5$ of 1:1, I may use a glassy molecularly dehydrated phosphate having a molar ratio of $Na_2O$ to $P_2O_5$ as low as about 0.9:1 or as high as about 1.7:1. The molecularly dehydrated phosphate having the ratio of 0.9:1 contains about 28% $Na_2O$ and about 72% $P_2O_5$. The molecularly dehydrated phosphate having the ratio of 1.7:1 contains about 43% of $Na_2O$ and 57% of $P_2O_5$. The crystalline molecularly dehydrated phosphate of this composition is sodium tripolyphosphate of the formula $Na_5P_3O_{10}$.

I have found that the effectiveness of the molecularly dehydrated phosphates in the manufacture of cultured buttermilk depends upon the physical character of the phosphate. The glassy molecularly dehydrated phosphates are effective but the crystalline molecularly dehydrated phosphates are not effective, with the single exception of alkali tripolyphosphates. Sodium tripolyphosphate improves the flavor and decreases wheying off, even though it is a crystalline material, but the other crystalline materials such as sodium pyrophosphate $Na_4P_2O_7$ and crystalline sodium metaphosphate known as sodium trimetaphosphate are not effective in the present invention. The present invention, therefore, includes only the glassy molecularly dehydrated phosphates and the crystalline tripolyphosphate but no other crystalline molecularly dehydrated phosphates. The invention does include, however, mixtures of other materials with either or both of glassy molecularly dehydrated phosphate and crystalline tripolyphosphate, because such mixtures contain the effective molecularly dehydrated phosphates. Thus, mixtures containing crystalline molecularly dehydrated phosphates may be made by annealing the glassy molecularly dehydrated phosphates and the mixture of crystalline phosphates is effective if tripolyphosphate is present. If any glassy phosphates is annealed at a temperature of 300° C. or higher but below its melting point, for a sufficient time, say at a temperature of 500° C. for one hour and then cooled, a crystalline material is obtained. If the glass is hexametaphosphate, the crystalline product is trimetaphosphate $(NaPO_3)_3$. If the glass contains a ratio of $Na_2O:P_2O_5$ corresponding to tripolyphosphate $(Na_5P_3O_{10})$, the crystalline product is tripolyphosphate. Glasses having $Na_2O:P_2O_5$ ratios between hexametaphosphate and tripolyphosphate when annealed give crystalline mixtures of trimetaphosphate and tripolyphosphate. For example, a glass containing approximately 40% $Na_2O$ and 60% $P_2O_5$ when annealed results in a crystalline product which is a mixture of crystalline tripolyphosphate and crystalline trimetaphosphate, the crystalline tripolyphosphate predominating and is effective, the trimetaphosphate being present in relatively small amount and is relatively ineffective.

The glassy phosphates may be readily distinguished from the crystalline phosphates by X-ray analysis. The spectrum for a glassy phosphate shows diffused bands, while that for a crystalline phosphate shows distinct lines. In the claims, the term "glassy" is, therefore, used to designate a material whose X-ray spectrum shows diffused bands.

Although I prefer to use the molecularly dehydrated sodium phosphates for reasons of economy, I may use the soluble molecularly dehydrated phosphates of potassium, lithium or ammonium.

The invention is not limited to the preferred materials or proportions, which have been given merely by way of example, but may be otherwise embodied or practiced within the scope of the following claims.

I claim:

1. The process of improving the flavor of cultured buttermilk and minimizing wheying off in the manufacture thereof, which comprises adding to skim milk containing bacteria culture, at the same time as or shortly after the bacteria culture is added, a small amount of a molecularly dehydrated phosphate of the group consisting of glassy molecularly dehydrated alkali phosphates and alkali tripolyphosphates in which the molar ratio of alkali oxide to phosphorus pentoxide is between about 0.9:1 and 1.7:1, maintaining the mixture at a suitable temperature until the desired acidity, flavor and aroma have been acquired and then cooling it.

2. The process of improving the flavor of cultured buttermilk and minimizing wheying off in the manufacture thereof, which comprises adding to skim milk containing bacteria culture, at the same time as or after the bacteria culture is added, a small amount of a molecularly dehydrated phosphate of the group consisting of glassy molecularly dehydrated sodium phosphates and sodium tripolyphosphate which contain between about 57% to 72% of $P_2O_5$, maintaining the mixture at a suitable temperature until the desired acidity, flavor and aroma have been acquired and then cooling it.

3. Cultured buttermilk containing added bacteria culture and a small amount of a molecularly dehydrated phosphate of the group consisting of glassy molecularly dehydrated alkali phosphates and alkali tripolyphosphates in which the molar ratio of alkali oxide to phosphorus pentoxide is between about 0.9:1 and 1.7:1, said buttermilk being characterized by the fact that in its production said molecularly dehydrated phosphate is added to skim milk at the same time as or shortly after the bacteria culture is added, and further characterized by the fact that it contains a higher milk sugar content than cultured buttermilk produced in the same manner except that no molecularly dehydrated phosphate is added.

4. Cultured buttermilk containing added bacteria culture and a small amount of a molecularly dehydrated phosphate of the group consisting of glassy molecularly dehydrated sodium phosphates and sodium tripolyphosphate which contain between about 57% to 72% of $P_2O_5$, said buttermilk being characterized by the fact that in its production said molecularly dehydrated phosphate is added to skim milk at the same time as or shortly after the bacteria culture is added, and further characterized by the fact that it contains a higher milk sugar content than cultured buttermilk produced in the same manner except that no molecularly dehydrated phosphate is added.

5. Cultured buttermilk containing added bacteria culture and about ⅛ ounce to 1½ ounces per ten gallons of buttermilk of a molecularly dehydrated phosphate of the group consisting of glassy molecularly dehydrated alkali phosphates and alkali tripolyphosphates in which the molar ratio of alkali oxide to phosphorus pentoxide is between about 0.9:1 and 1.7:1, said buttermilk being characterized by the fact that in its production said molecularly dehydrated phosphate is added to skim milk at the same time as or shortly after the bacteria culture is added, and further characterized by the fact that it contains a higher milk sugar content than cultured buttermilk produced in the same manner except that no molecularly dehydrated phosphate is added.

CHARLES SCHWARTZ.

CERTIFICATE OF CORRECTION.

Patent No. 2,311,599. February 16, 1943.

CHARLES SCHWARTZ.

It is hereby certified that error appears in the printed specification of the above numbered patent requiring correction as follows: Page 2, second column, line 8, claim 2, for "or after" read --or shortly after--; line 49, claim 5, for "oune" read --ounce--; and that the said Letters Patent should be read with this correction therein that the same may conform to the record of the case in the Patent Office.

Signed and sealed this 30th day of March, A. D. 1943.

(Seal)

Henry Van Arsdale,
Acting Commissioner of Patents.